(12) United States Patent
Lee et al.

(10) Patent No.: US 12,279,073 B2
(45) Date of Patent: Apr. 15, 2025

(54) LIMITING SOFTWARE FUNCTIONALITY ACCESS BASED ON DEVICE MODE

(71) Applicant: Zoom Communications, Inc., San Jose, CA (US)

(72) Inventors: Cynthia Eshiuan Lee, Austin, TX (US); Jeffrey William Smith, Layton, UT (US); Jordan Thiel, Leander, TX (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/309,369

(22) Filed: Apr. 28, 2023

(65) Prior Publication Data

US 2023/0269348 A1 Aug. 24, 2023

Related U.S. Application Data

(63) Continuation of application No. 17/472,532, filed on Sep. 10, 2021, now Pat. No. 11,677,906.

(51) Int. Cl.
*H04N 7/15* (2006.01)
*H04L 12/18* (2006.01)

(52) U.S. Cl.
CPC ......... *H04N 7/155* (2013.01); *H04L 12/1827* (2013.01); *H04L 12/1831* (2013.01)

(58) Field of Classification Search
None
See application file for complete search history.

(56) References Cited

U.S. PATENT DOCUMENTS

| | | | |
|---|---|---|---|
| 7,119,829 B2 | 10/2006 | Leonard et al. | |
| 9,106,975 B1 | 8/2015 | Gildfind et al. | |
| 9,690,465 B2 | 6/2017 | Tuck et al. | |
| 9,998,580 B2 | 6/2018 | Brogan et al. | |
| 10,165,391 B2 | 12/2018 | Krochmal et al. | |
| 10,489,414 B2 | 11/2019 | Kollenkark et al. | |

(Continued)

OTHER PUBLICATIONS

Microsoft Mobile Sharing and Companion Experiences for Microsoft Teams Meetings, Use your computer and phone together in video meetings, https://www.microsoft.com/en-us/garage/wall-of-fame/companionexperiences/, Aug. 5, 2021, 3 pages.

(Continued)

*Primary Examiner* — Hemant S Patel
(74) *Attorney, Agent, or Firm* — Young Basile Hanlon & MacFarlane, P.C.

(57) ABSTRACT

Access to functionality of a software service is enabled at a first device associated with a user based on the first device being in a primary mode. A connection may thereafter be established between the software service and a second device associated with the same user. In response to that connection, access to a subset of the functionality of the software service is limited at the second device based on the second device being in a secondary mode determined based on the second device. Because the first device and the second device are used by the same user, the software service does not represent those devices as separate users of the software service, but rather identifies only the first device, as the primary mode device, in connection with the user to other users of the software service.

20 Claims, 8 Drawing Sheets

(56) References Cited

U.S. PATENT DOCUMENTS

| | | |
|---|---|---|
| 11,677,906 B2* | 6/2023 | Lee .................... H04L 12/1831 |
| | | 348/14.08 |
| 2009/0150553 A1 | 6/2009 | Collart et al. |
| 2013/0136089 A1 | 5/2013 | Gillett et al. |
| 2016/0127432 A1* | 5/2016 | Privat ................ H04L 65/1069 |
| | | 709/204 |
| 2018/0124136 A1* | 5/2018 | Faulkner .................. H04N 7/15 |
| 2021/0136129 A1 | 5/2021 | Ponnusamy et al. |
| 2023/0308602 A1 | 9/2023 | Wang et al. |
| 2024/0073372 A1 | 2/2024 | Lin et al. |
| 2024/0214232 A1 | 6/2024 | Reszka et al. |

OTHER PUBLICATIONS

Google Workspace, Navigating hybrid work with a single, connected experience in Google Workspace, https://cloud.google.com/blog/products/workspace/helping-business-with-new-additions-to-google-workspace, Javier Soltero, Jun. 14, 2021, 7 pages.

International Search Report and Written Opinion mailed on Nov. 29, 2022 in corresponding PCT Application No. PCT/US2022/042858.

International Search Report and Written Opinion mailed on Oct. 24, 2024 in corresponding PCT Application No. PCT/US2024/040110.

* cited by examiner

LIMITING SOFTWARE FUNCTIONALITY ACCESS BASED ON DEVICE MODE

CROSS-REFERENCE TO RELATED APPLICATION(S)

This application is a continuation of U.S. application Ser. No. 17/472,532, filed Sep. 10, 2021, the entire disclosure of which is herein incorporated by reference.

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for secondary mode device software access for primary mode device users.

One aspect of this disclosure is a method, which includes enabling access to functionality of a software service at a first device associated with a user based on the first device being in a primary mode, and, responsive to a connection established between the software service and a second device associated with the user, limiting access to a subset of the functionality of the software service at the second device based on the second device being in a secondary mode, in which the secondary mode is determined based on the second device.

Another aspect of this disclosure is an apparatus, which includes a memory and a processor configured to execute instructions stored in the memory to enable access to functionality of a software service at a first device associated with a user based on the first device being in a primary mode, and, responsive to a connection established between the software service and a second device associated with the user, limit access to a subset of the functionality of the software service at the second device based on the second device being in a secondary mode, in which the secondary mode is determined based on the second device.

Yet another aspect of this disclosure is a non-transitory computer readable medium storing instructions operable to cause one or more processors to perform operations, which include enabling access to functionality of a software service at a first device associated with a user based on the first device being in a primary mode, and, responsive to a connection established between the software service and a second device associated with the user, limiting access to a subset of the functionality of the software service at the second device based on the second device being in a secondary mode, in which the secondary mode is determined based on the second device.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
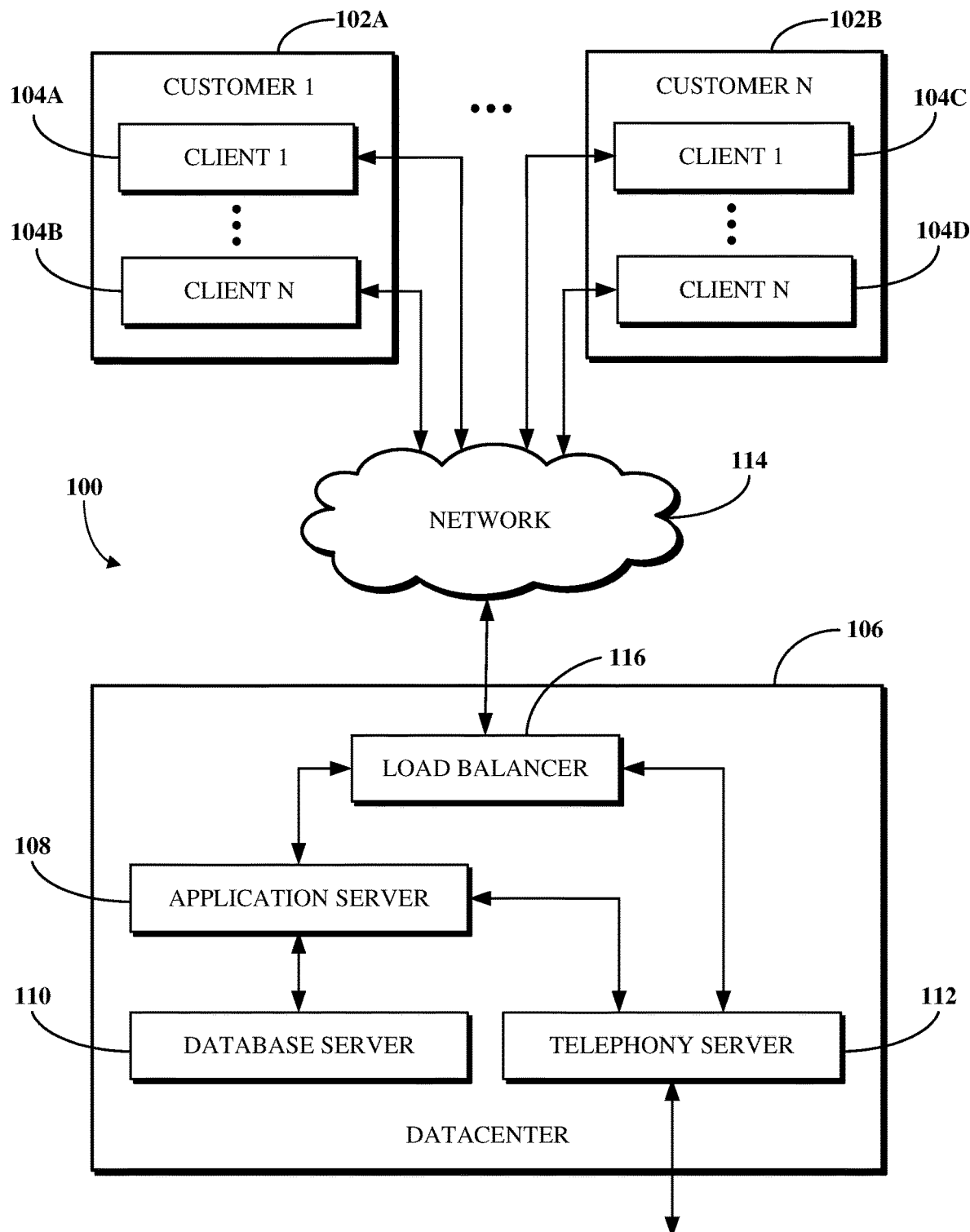
FIG. 1 is a block diagram of an example of an electronic computing and communications system.

Users of a software platform, such as a UCaaS platform, may connect to various software services implemented by the software platform over a number of different devices. In particular, client applications of the software platform may be provided for several different device types, including, but not limited to, desktop computers, laptop computers, tablet computers, and smartphones. The client applications communicate with servers used by the software platform to enable devices of those device types to connect with the various software services. In one example, a user may choose a device with a built-in microphone and camera to connect to conferencing software of the software platform, such as to enable audio and visual input and output for the user to interact with other conference participants via that device.

While client applications may be available for a number of devices, certain types of devices are more desirable for certain software activities, and so a user may desire to use certain device types for certain purposes and other device types for other purposes. For example, a desktop or laptop computer may be a desirable device to use for participating in a conference over conferencing software because such devices typically have speakers and a large display for outputting audio and video content, a built-in microphone and camera for capturing audio and video input, and a physical keyboard for capturing text input for chat purposes. However, a desktop or laptop computer may not be a desirable device to use for digital whiteboarding given that such devices typically do not include a touch interface and it is most efficient to use a touch interface for digital whiteboarding. On the other hand, a tablet computer may be a desirable device for digital whiteboarding given that it has a touch interface, but may not be a desirable device for conference participation given the smaller display and generally more cumbersome virtual keyboard.

In many cases, a user of a software service (e.g., of a software platform) has access to multiple devices of different device types. However, in some cases, a user may not be allowed to be simultaneously connected to a software service from multiple devices, or it may otherwise be cumbersome or technically challenging to do so. For example, the software service may detect that the user's account is already logged in at a given device and prohibit further devices of that user from accessing that software service using the same account for security purposes. Furthermore, even where such simultaneous connection is allowed, many conventional software services do not intuitively allow users to connect to a single software service instance using multiple devices for different purposes without the instance representing each device as a different user. Thus, a user who wishes to connect to a software service using multiple devices must create a separate connection for each of those devices with the server implementing the service. For example, conventional conferencing software may in some cases enable a single user to connect multiple devices, but the conferencing software would represent each such device as a separate participant within a list of participants or gallery view interface. This may at a minimum create confusion across conference participants. For example, other participants may not know which participant representation to contact for chat purposes or have security concerns regarding who is actually using those other devices.

Implementations of this disclosure address problems such as these by enabling a user to access a software service using multiple devices in which one device is connected in a primary mode and other devices are connected in one or more secondary modes. In particular, access to functionality of a software service is enabled at a first device associated with a user based on the first device being in a primary mode. A connection may thereafter be established between the software service and a second device associated with the same user. In response to that connection, access to a subset of the functionality of the software service is limited at the second device based on the second device being in a secondary mode determined based on the second device. Because the first device (i.e., the primary mode device) and the second device (i.e., the secondary mode device) are used by the same user, the software service does not represent those devices as separate users of the software service, but rather identifies only the primary mode device in connection with the user to other users of the software service.

As used herein, the term "primary mode" refers to a designated configuration in which access to all of the functionality of a software service remains available to a subject device, and the term "secondary mode" refers to a designated configuration in which access to at least some functionality of the software service is limited for a subject device such that a device designated in a secondary mode has access to less functionality of the software service than a device designated in the primary mode. There may be one or more different secondary modes available for a given device. In one example, a secondary mode may be a companion mode in which the subject device may be used with some or all interactive functionality of the software service. In another example, a secondary mode may be a view-only mode or a listen-only mode in which the subject device may be used to present video and/or audio output of the software service to the user without interacting with functionality of the software service. In many cases, devices which could be primary mode devices may be designated in the companion mode where another device is already designated in the primary mode. In this way, those devices may still be used to interact with the software service in some way while in the companion mode, whereas those devices would generally be limited to presenting video and/or audio output while in the view-only mode or the listen-only mode.

To illustrate the use of primary and secondary mode designations for devices of a user, an example will now be described with respect to conferencing software as the subject software service. A user connects to the conferencing software using a first device, such as a desktop or laptop computer, which is designated in the primary mode. At some point during the conference, the conference participants decide to begin a digital whiteboarding exercise. The user of the first device connects to the conferencing software using a second device, such as a tablet computer or smartphone, which is designated in a secondary mode. Whereas the primary mode device may be used for audio and video input capture, audio and video output presentation, conference control selection (e.g., for disabling an audio capture device or a video capture device or for screen sharing), and other functionality as is typically made available to devices connected to the conferencing software, the secondary mode device may instead be limited to displaying the digital whiteboard and to capturing input usable to modify the digital whiteboard. Although the secondary mode device is connected to the same conferencing software instance as the primary mode device, the user of those devices is identified to other conference participants only via the primary mode device. In particular, a single user interface tile representative of the user of the primary and secondary mode devices may be presented within a user interface of the conferencing software. Similarly, the participant list for the conference lists the name of the user of the primary and secondary mode devices once.

As with the above, the implementations hereof are described by example throughout this disclosure with respect to conferencing software as the subject software service; however, this disclosure is not limiting as to the types of software services with which a primary mode device and corresponding secondary mode devices may be used. Other examples of software services with which the implementations of this disclosure may be used include telephony software (e.g., in which certain call features are limited in secondary modes). Thus, according to this disclosure, a first device may be designated as a primary mode device with full access to functionality of a software service and one or more second devices may each be designated as a secondary mode device with limited access to the functionality of the software service.

To describe some implementations in greater detail, reference is first made to examples of hardware and software structures used to implement a system for secondary mode device software access for primary mode device users. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
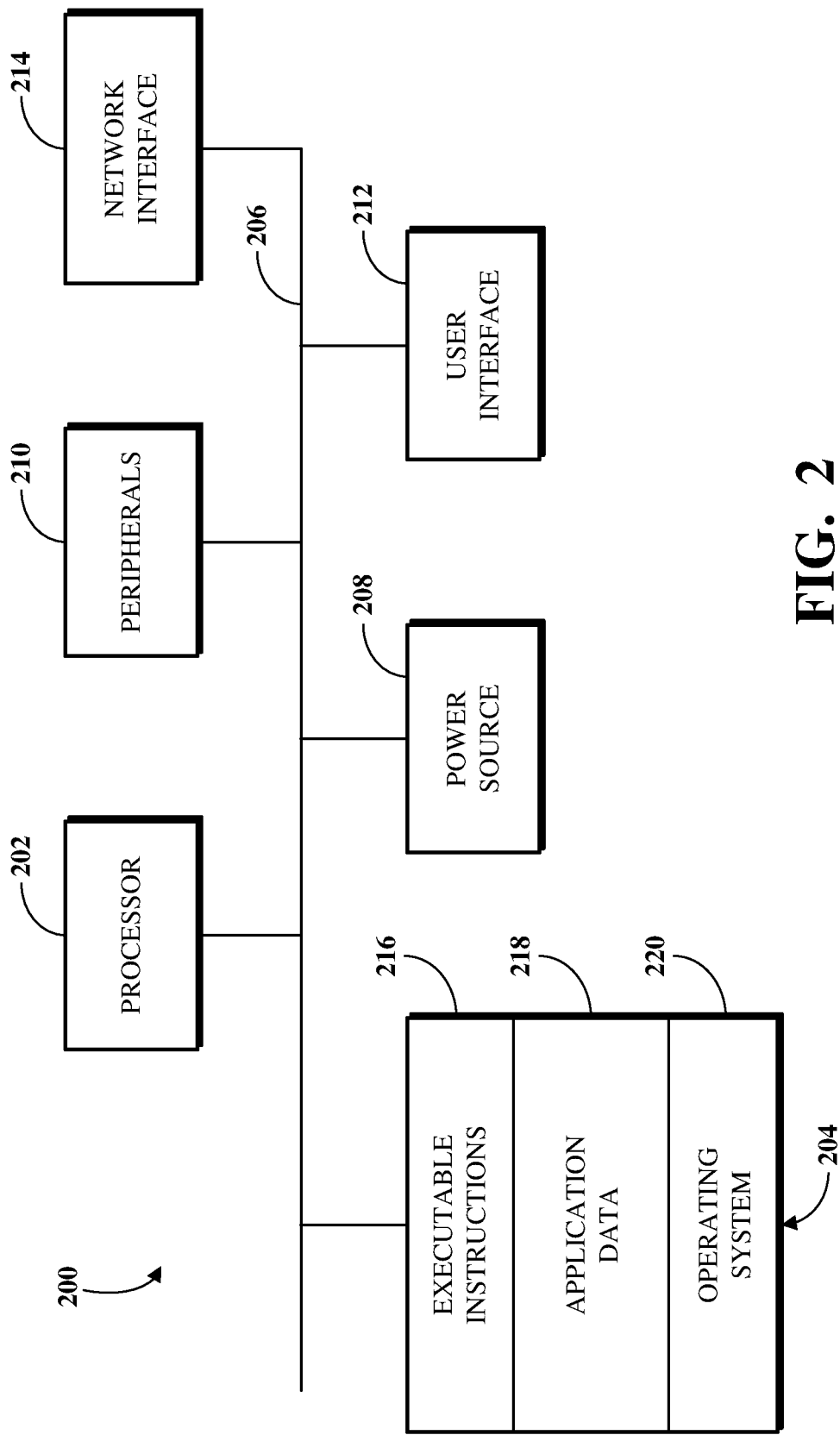
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®, an operating system for a mobile device, such as a smartphone or tablet computer; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
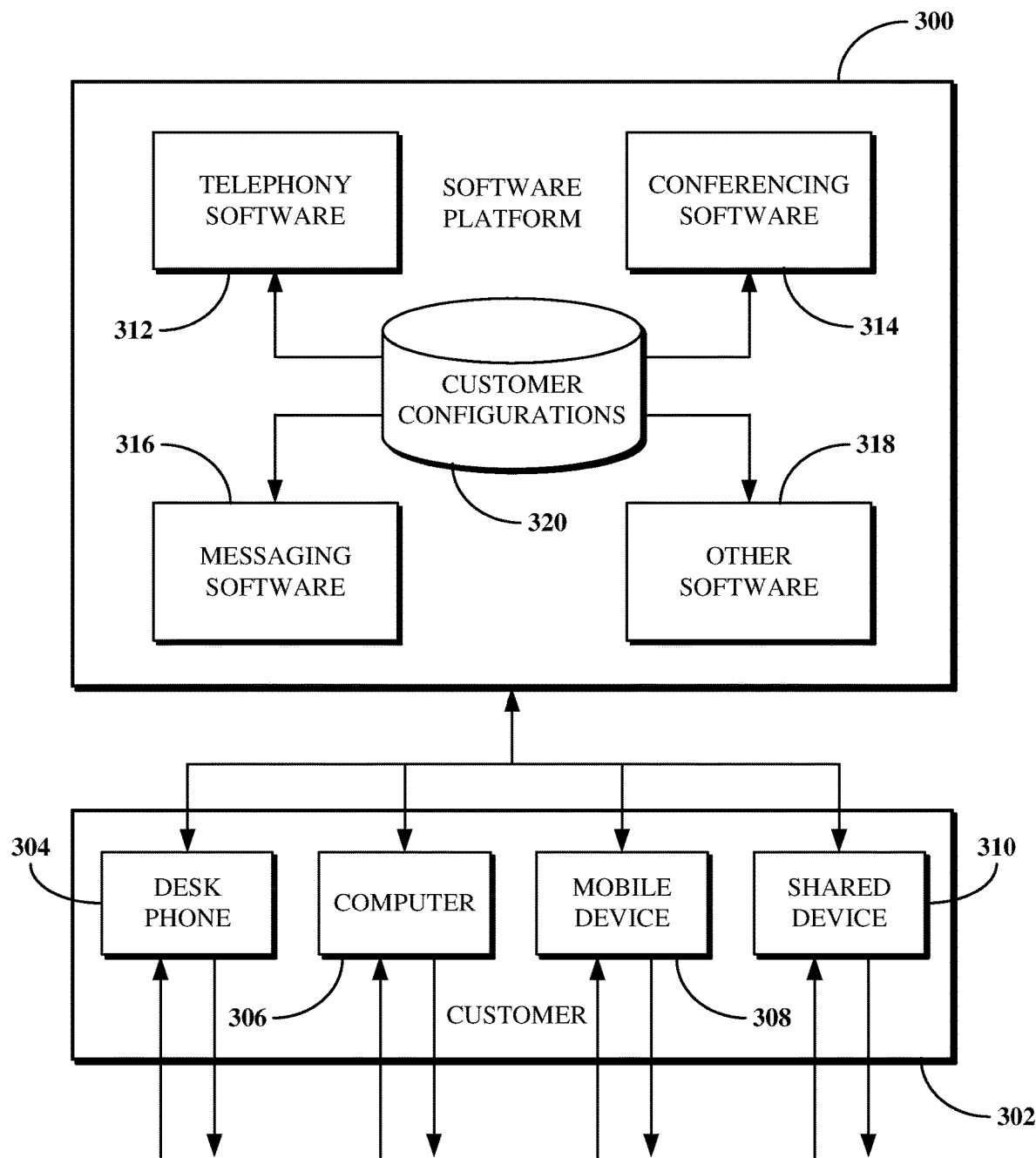
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for enabling and limiting secondary mode device software access for primary mode device users.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
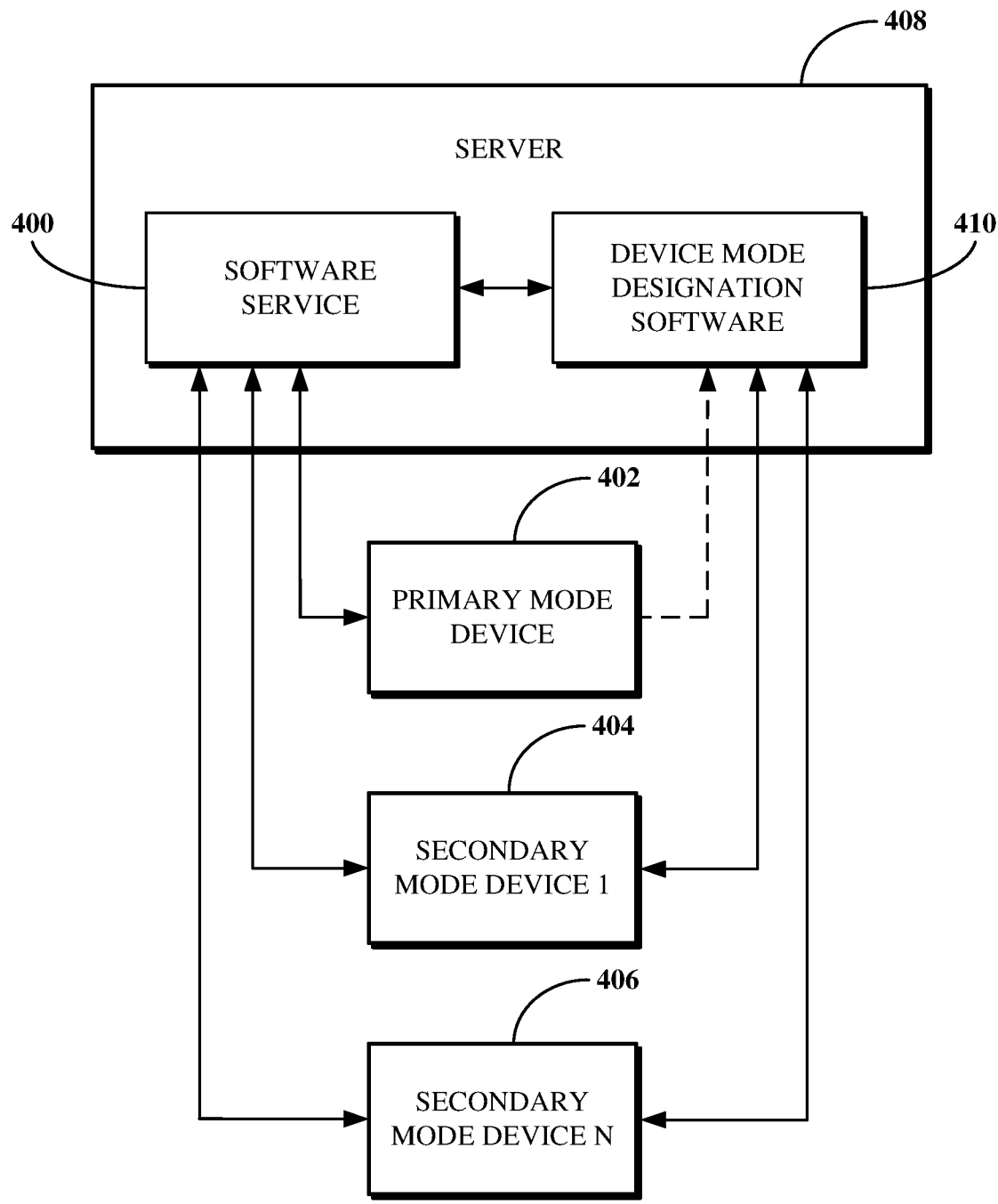
FIG. 4 is a block diagram of an example of devices connected to a software service in a primary mode or a secondary mode.

FIG. 4 is a block diagram of an example of devices connected to a software service 400 in a primary mode or a secondary mode. The devices include a primary mode device 402, a secondary mode device 1 404, and a secondary mode device N 406, in which N is an integer greater than 1. In one example, the primary mode device 402 may be a desktop or laptop computer, the secondary mode device 1 404 may be a tablet computer, and the secondary mode device N 406 may be a television. The devices 402 through 406 are used with the software service 400 by the same user. While access to functionality of the software service 400 is enabled for the primary mode device 402, such access is limited for the secondary mode device 1 404 and the secondary mode device 406. As will be described below, the limitation on access to functionality of the software service 400 for a secondary mode device is based on the type of secondary mode in which that device is designated. Although multiple secondary mode devices 504 and 506 are shown, in many cases, a single secondary mode device may be used.

The software service 400 is implemented at a server 408, which may, for example, be the application server 108 shown in FIG. 1. In one example, the software service 400 may be conferencing software used to implement conferences, such as the conferencing software 314 shown in FIG. 3. Device mode designation software 410 may also be implemented at the server 408. The device mode designation software 410 designates the particular mode, either the primary mode or a secondary mode, for each of the devices 402 through 406 and reports that mode to the software service 400. The device mode designation software 410 maintains data identifying modes designated for devices associated with a user account. The software service 400 and the device mode designation software 410 communicate information between each other such as which devices are connected to the software service 400 and device modes designated for those devices. In some implementations, the software service 400 may include the device mode designation software 410. In some implementations, the device mode designation software 410 may be implemented at a server other than the server 408.

To determine whether to designate a subject device in the primary mode or in a secondary mode, the device mode designation software 410 uses information about the capabilities of the subject device and/or information from the software service 400 identifying whether the subject device is a first or only device associated with a given user account to be connected to the software service 400 at a given time. Accordingly, in some cases, the first device of a user to connect to the software service 400 may be designated as being in the primary mode and thus be identified as the primary mode device 402, provided that such first device includes components usable for input capture (e.g., one or more microphones and/or cameras) and output presentation (e.g., one or more speakers and/or displays). Devices later connecting to the software service 400 after the primary mode is designated in the primary mode device 402 may thus be designated in a secondary mode and thus identified as one of the secondary mode device 1 404 through the secondary mode device N 406. In other cases, a first device to connect to the software service 400 may be designated as being in the primary mode independent of information about the capabilities thereof.

The user account may be an account created for a software platform which includes multiple software services, for example, the software platform 300 shown in FIG. 3. As such, the user account may in at least some cases be associated with software services beyond the software service 400. For example, the software service 400 may be one of multiple software services available through a client application associated with the software platform. After the primary mode device 402 connects to the software service 400, the device mode designation software 410 uses information identifying other devices which are logged into the software platform or a software service thereof under the same user account to identify the other devices which can connect to the software service 400 in a secondary mode. For example, the user may be logged into client applications under the same user account at each of the primary mode device 402, the secondary mode device 1 404, and the secondary mode device N 406.

To illustrate the device mode designation process by example, a conference may be implemented by the software service 400. The user of a first device connects to the software service 400 to join the conference, and a UI tile for the user and associated with the first device is presented within a UI of the conference. The software service 400 identifies that the first device is associated with a user account for the user and that it is the only device associated with that user account connected to the conference. The software service 400 communicates that information to the device mode designation software 410, which automatically designates the first device in the primary mode (i.e., the first device becomes the primary mode device 402). The primary mode device 402, being in the primary mode, retains access for full functionality of the software service 400, such as for transmitting audio and/or video input for rendering within a UI for the conference, participating in digital whiteboarding through the conference, and selectively using controls for the conference (e.g., to disable audio and/or video input, such as by "muting" the audio or "stopping" the video, viewing participant lists for the conference, starting or stopping screen sharing with other participants, messaging conference participants, or sharing emoticons). Thereafter, the user simultaneously or at different times opens a client application associated with the software service 400 to log into his or her user account at two other devices. The device mode designation software 410 identifies those other devices as being authorized to join the conference alongside the primary mode device 402 based on a same user account being logged in at those other devices. Responsive to the user selecting to join the conference at each of those other devices, those other devices are connected to the software service 400 and designated in a secondary mode by the device mode designation software 410 (i.e., one of those other devices becomes the secondary mode device 1 404 and the other becomes the secondary mode device N 406). The secondary mode assigned to the secondary mode device 1 404 is a companion mode because the secondary mode device 1 404 is determined to have audio and/or video input capture and output presentation functionality. The secondary mode device 1 404 is granted limited access to functionality of the software service 400, such as by limiting the secondary mode device 1 404 to digital whiteboard participation and control access only. The secondary mode assigned to the secondary mode device N 406 is a view-only mode or a listen-only mode because the secondary mode device N 406 is determined to have audio and/or video output presentation functionality but not input capture functionality. The secondary mode device N 406 is granted limited access to functionality of the software service 400, such as by limiting the secondary mode device N 406 to audio and video output presentation only. Because the secondary mode device 1 404 and the secondary mode device N 406 are in secondary modes, UI tiles for those devices are not presented in a UI of the conference. Accordingly, the connection of the primary mode device 402 to and use of same at the conference will be visible to other users whereas the connection of the secondary mode device 1 404 and the secondary mode device N 406 to and use of same at the conference may be invisible to those other users. In one configuration, the UI of the conference may display an indication of which devices corresponding to a user account are in use in the secondary mode.

The order by and timing in which the secondary mode device 1 404 and the secondary mode device N 406 are added is up to the user. For example, the secondary mode device N 406, which may be a television having a larger display, may be connected to the conference right after the primary mode device 402 is connected to give the user a better view of conference participants. In another example, the secondary mode device 1 404, which may be a tablet computer having a touch interface, may be connected to the conference in response to one of the conference participants launching a digital whiteboard exercise. In another example, a secondary mode device 1 404 may join a conference first (in the primary mode) and then be relegated to the secondary mode in response to a primary mode device 402 joining the conference (e.g., when the primary mode device 402 has more functionality than the secondary mode device 1 404 or when the intent of the user is established indicating which device should operate in primary mode and which device should operate in secondary mode).

Given that the designation of the devices 402 through 406 is based on user account information for the subject user, the designation of a device as the primary mode device 402 may preclude other devices associated with that user account from being designated in the primary mode until the primary mode device 402 disconnects from the software service. However, in some implementations, multiple devices associated with a user account may be designated in the primary mode. For example, where the software service 400 is conferencing software, privileges may be defined, such as by the user or an account administrator, for multiple devices associated with the user account to be concurrently designated in the primary mode to allow the user to connect different devices each in the primary mode to different (or the same) conferences implemented by the conferencing software.

Although the devices 402 through 406 are described above with respect to devices such as the clients 304 through 310 shown in FIG. 3, other device types may be used as a primary mode device and/or as a secondary mode device. In some implementations, the primary mode device may be an autonomous vehicle which includes network connectivity and capabilities for audio and/or video input capture and output presentation. For example, a secondary mode device may be a mobile device used by the user while riding in the autonomous vehicle. In some implementations, the primary mode device may be a device integrated within a non-autonomous vehicle, such as a device located at a seat of an airplane, train, boat, or bus. For example, a secondary mode device may be a mobile device used by the user while riding in a non-autonomous vehicle.

In some implementations, the secondary mode device 1 404 and/or the secondary mode device N 406 may be a shared device. For example, the shared device may be a device that the user account is currently logged into, the user account has previously been logged into, or that can be paired with the primary mode device 402 using a local detection, such as over a short range protocol (e.g., Bluetooth), ultrasonic frequency, or using a code available based on overlapping geolocations of the primary mode device 402 and the shared device. In some such implementations, the shared device may be enabled for use in a group mode which allows use of the shared device to be passed between a group of users. For example, the shared device may be a digital whiteboarding device which may be represented in a companion mode for a given user while that user is using the digital whiteboarding device. When a different user begins to use the digital whiteboarding device, the digital whiteboarding device may be represented in a companion mode for the different user. In some such implementations, a video capture device within a physical space that includes the shared device can output a video stream that, when processed using facial recognition or like intelligence software, can determine an identity of a user who is actively using a shared device at a given time. In some implementations, such as where one or more users are physically or virtually grouped together, a shared device can be used by all users of that group at a given time. For example, a shared conference room device may be designated in a group mode which has the same effect as the companion mode, view-only mode, or listen-only mode, but is simultaneously associated with multiple users rather than a single user account as with a typical secondary mode device.

In some implementations, knowledge of devices which may be associated with a user account may be based on data stored within a database or other data store accessible to the device mode designation software 410. For example, information identifying a device, such as an IP address or MAC address, may be stored in response to a user account associated with the software service 400 being logged into at the device, such as by a client application at that device being logged into under that user account. Because the user account may be associated with multiple software services, the information identifying a given device as being associated with a user account may thus in at least some cases be stored before the user accesses the software service 400. In some such implementations, responsive to the primary mode device 402 connecting to the software service 400 and being designated in the primary mode, the device mode designation software 410 may access the database or other data store to identify one or more other devices for potential connection to the software service 400 in a secondary mode.

In some implementations, the use of a secondary mode device by a given user of a software service may be visible to other users of the software service. For example, an administrator of a user account associated with the secondary mode device may configure the software service to display connected secondary mode devices for one or more users. In some such implementations, information identifying the presence and/or type of a given secondary mode device may be visible in a list of users of the software service (e.g., a participant list, where the software service includes conferencing software).

Figure 5:
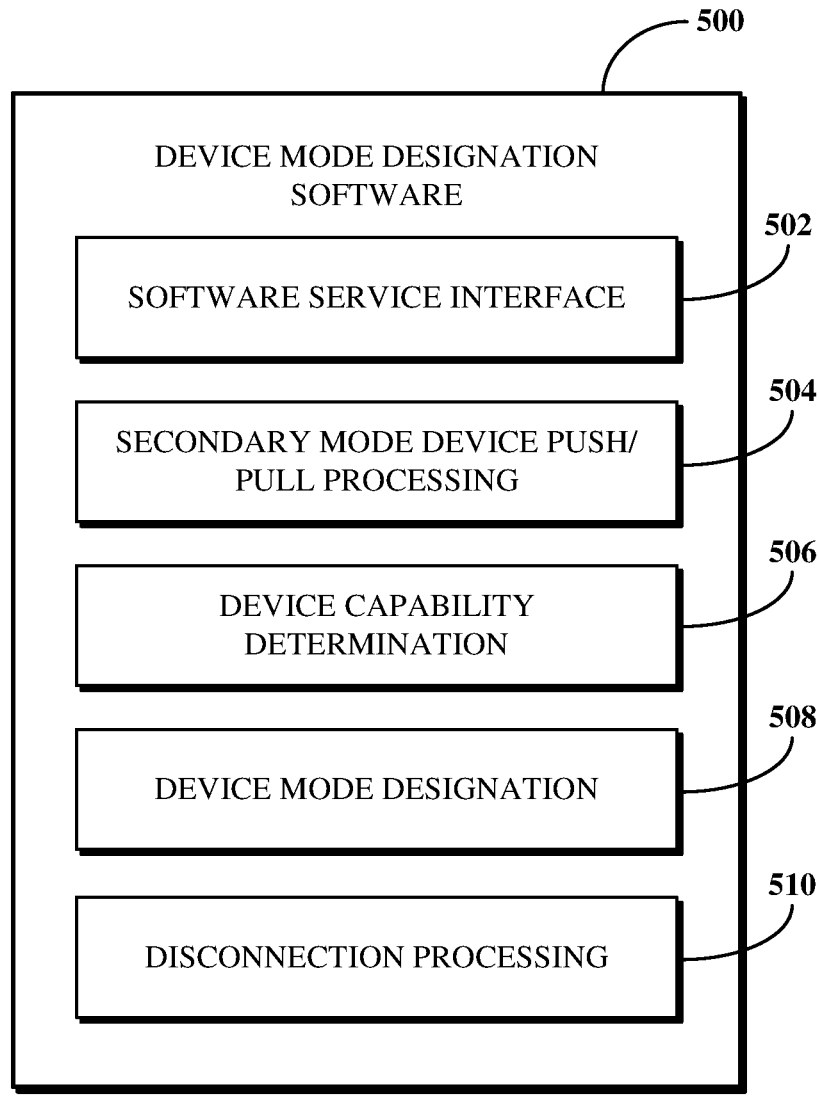
FIG. 5 is a block diagram of an example of functionality of device mode designation software.

FIG. 5 is a block diagram of an example of functionality of device mode designation software 500, which may, for example, be the device mode designation software 510 shown in FIG. 4. The device mode designation software 500 includes tools, such as programs, subprograms, functions, routines, subroutines, operations, and/or the like for enabling and limiting secondary mode device software access for primary mode device users. As shown, the device mode designation software 500 includes a software service interface 502, a secondary device push/pull processing tool 504, a device capability determination tool 506, a device mode designation tool 508, and a disconnection processing tool 510.

The software service interface 502 enables communication with a software service which devices are connected to and used in the primary mode or a secondary mode, such as the software service 400 shown in FIG. 4. The software service interface 502 may open a channel between the software service and the device mode designation software 500 in response to a first device associated with a user account connecting to the software service. Information identifying the connection of the first device to the software service may be communicated to the device mode designation software 500 using the channel. The communicated information may cause the device mode designation software 500 to designate that first device in the primary mode. Information identifying secondary mode devices which have connected to the software service may also be communicated to the device mode designation software 500 using the channel.

The secondary mode device push/pull processing tool 504 enables connections of other devices to be designated in a secondary mode (e.g., based on a primary mode device already being designated for a subject user account) to the software service using push or pull processing. Pull processing as used herein refers to the device mode designation software 500 identifying a device to potentially connect to the software service in a secondary mode and prompting the user thereof to ask whether to connect the device to the software service. Push processing as used herein refers to a user taking steps to connect a device to the software service as a secondary mode device without the device mode designation software 500 first prompting the user to ask whether to connect the device to the software service.

Pull processing may be initiated after a user is already connected to the software service using a primary mode device and after a same user account as is associated with the primary mode device has been logged into at another device. For example, pull processing can occur after the user either, at another device, logs into a user account at a client application associated with the software service or opens the client application at which login credentials for the user account have already been authenticated. In another example, where the client application is not open at the other device but records at that other device or at a server (e.g., the server 408 shown in FIG. 4) indicate that the user account has been logged into at the other device, an operating system-level can be pushed according to permissions granted for the other device to cause the client application to open thereat. Thereafter, in either case, the device mode designation software 500 transmits a notification to that other device to prompt the user to connect to the software service. The user may respond to the prompt by indicating to connect the other device to the software service. The device mode designation software 500 then determines a secondary mode for the other device, as described below, and thereafter communicates with the software service to cause the other device to connect to the software service in that secondary mode. For example, the device mode designation software 500 may communicate instructions, commands, or data configured to cause a channel to be opened between the other device and the software service.

Push processing may be initiated by the user selecting the other device to which to connect to the software service in a secondary mode. For example, a client application at the primary mode device may present a list of available devices to connect to the software service in a secondary mode. In some cases, the user may further select the particular type of secondary mode to use for that other device. For example, the client application at the primary mode device may show a list of selectable secondary mode options for respective available devices. The device mode designation software 500 can present the selectable secondary mode option information within the client application based on a determination of device capabilities for those available devices, as described below. After the user has selected a given device to connect to the software service, whether or not a secondary mode option is selected by the user, the device mode designation software 500 communicates with the software service to cause the other device to connect to the software service in that secondary mode. For example, the device mode designation software 500 may communicate instructions, commands, or data configured to cause a channel to be opened between the other device and the software service.

The device capability determination tool 506 identifies capabilities of devices which may be connected to the software service in a secondary mode. Device capabilities are relevant to determining the particular secondary mode to designate for a given device because the device may in some cases be unable to support one or more secondary modes. Device capabilities may be inferred based on a known or assumed device type, such as based on operating system information and/or hardware information obtained from a given device. For example, a given device may be known to correspond to smartphones because it uses a mobile device operating system (e.g., Android or iOS). Because smartphones include one or more microphones for audio capture, one or more cameras for video capture, one or more speakers for audio output, and a display for video output, the device capabilities for a device known or assumed to be a smartphone indicate that the device can support audio and/or video input and output. The given device, being a smartphone, may thus be used in secondary modes including a companion mode, a view-only mode, or a listen-only mode. In another example, a given device may be known to correspond to televisions because it includes multiple wired connection ports and omits audio and video input capture components. Because televisions include one or more speakers for audio output and a display for video output, the device capabilities for a device known or assumed to be a television indicate that the device can support audio and/or video output. The given device, being a television, may thus be used in secondary modes including a view-only mode or a listen-only mode, but not in the companion mode since the given device does not include audio and/or video input capture components.

In some cases, the device capability determination tool 506 may determine whether a given device has hardware encoding capabilities before determining that the given device is capable of supporting a companion mode designation. The presence of hardware encoding capabilities can generally be determined based on hardware information obtained from a given device. Where a given device does not include hardware encoding capabilities, the device may be flagged for view-only or listen-only secondary modes. In some cases, the device capability determination tool 506 may check whether a given device can support a companion mode designation before identifying other capabilities of the device. That is, it is generally the case that a device which can support a companion mode designation can also support a view-only mode designation and/or a listen-only mode designation, but not the other way around. Information about the determined device capabilities can be used to flag respective devices for certain secondary mode support. For example, the device capability determination tool 506 may store data identifying supportable secondary modes for respective devices. In some cases, the supportable secondary mode data can be presented to a user, such as to allow the user to select a secondary mode for an available device. In some cases, the supportable secondary mode data can be used by the device mode designation software 500 itself, as described below, to automatically designate a secondary mode to a device.

The device mode designation tool 508 designates either a primary mode or a secondary mode for a device. The device mode designation tool 508 also maintains an understanding of which devices associated with a given user account are designated with which mode. The device mode designation tool 508 designates a first device connected to the software service in the primary mode. The device mode designation tool 508 later designates one or more second devices in a secondary mode, such as a companion mode, a view-only mode, or a listen-only mode. The particular secondary mode in which a given device is designated is based on the capabilities determined for that device. For example, the device mode designation tool 508 may automatically designate a device in a particular secondary mode based on its determined capabilities. In another example, the device mode designation tool 508 may designate a device in a particular secondary mode selected by a user based on its determined capabilities.

The designation of a particular mode defines the level of access the device has to functionality of the software service. The designation of a mode for a given device is communicated to the software service to cause the software service to limit access to functionality thereof for the given device based on the designated mode. The particular functionality of the software service which are not accessible using certain secondary modes may be defined by a developer of the software service, an administrator of the user account, or the user himself or herself. In some cases, the device mode designation tool 508 may attempt to designate a given device in the companion mode and may only designate it in the view-only mode or the listen-only mode based on the given device not supporting the companion mode.

In some implementations, the device mode designation tool 508 designates a secondary mode for a given device for reasons other than based on determined capabilities of that given device. For example, one or more secondary mode types may be disabled based on administrator configurations. In another example, historical data identifying secondary mode types in which a given device has been designated in the past may be used to suggest the secondary mode type.

The device mode designation tool 508 is configured to effectuate changes in device mode designations as determined by the disconnection processing tool 510, as described below. In some implementations, the device mode designation tool 508 may be further configured to change device mode designations for primary and secondary mode devices based on a triggering event. For example, a user of a primary mode device, such as a desktop or laptop computer, and a secondary mode device, such as a smartphone, may need to step outside of a room in which the primary mode device is located for one reason or another. The device mode designation tool 508, in response to determining that geolocation coordinates obtained for the primary mode device are more than a threshold distance (e.g., 100 feet) from geolocation coordinates obtained for the secondary mode device, may automatically change the primary mode device, as a new secondary mode device, to a secondary mode and the secondary mode device, as a new primary mode device, to the primary mode, or it may prompt the user to indicate whether to cause such a change. In some such implementations, where the primary mode device includes a camera and the mode designations between the primary mode device and a secondary mode device were changed, the device mode designation tool 508 can detect that the user is within a field of view of the camera and responsively either automatically change the new secondary mode device back to the primary mode and the new primary mode device back to the secondary mode or prompt the user to indicate whether to cause such a change.

The disconnection processing tool 510 processes changes in mode designations for devices which disconnect from the software service. The software service communicates data indicative of devices which disconnect from the software service either on an event-basis (e.g., in response to the device disconnecting or a detection thereof) or on a periodic-basis (e.g., on a discrete time interval). The disconnection processing tool 510 can, based on this communicated data, change mode designations for one or more devices remaining connected to the software service, delete data indicative of a mode designation of a disconnected device (e.g., immediately or after some threshold time period has elapsed since the communication of the disconnection data from the software service), communicate data back to the software service to cause the software service to disconnect one or more other devices associated with the same user account as the disconnected device, and/or take no action. A disconnection of a device from the software service may be voluntary (e.g., based on the user thereof intentionally ending the connection to the software service within a software application for the software service) or involuntary (e.g., based on network issues, power outage, or device failure).

By default, the disconnection processing tool 510 may be configured to cause any secondary mode devices to disconnect from the software service in response to determining that the primary mode device has disconnected from the software service. However, in some cases, the disconnection processing tool 510 may instead be configured, such as using a rule configured by the user or an administrator of the subject user account, to elevate a secondary mode device designated in the companion mode to the primary mode in response to determining that the primary mode device has disconnected from the software service. Elevating a companion mode device to the primary mode includes enabling access to full functionality of the software service for the elevated device and presenting a UI tile for the elevated device within a UI of the software service. For example, where a primary mode device disconnects from a conference, the disconnection processing tool 510 uses data identifying mode designations for other devices associated with the same user account to determine whether any other such devices are in the companion mode. If a companion mode device is identified, the user may be prompted to indicate whether to remain on the conference by elevating the companion mode device to the primary mode. Where the user indicates to elevate the companion mode device, a UI tile for the elevated device is presented within the conference UI. If no companion mode device is identified, the secondary mode devices may all be disconnected from the conference.

In some implementations, the disconnection processing tool 510 may be configured to cause a disconnection of a secondary mode device based on a physical distance between the secondary mode device and the primary mode device for the user account meeting a threshold. Geolocation information for each device connected to the software service can be made available to the disconnection processing tool 510, whether through the software service or otherwise. Where the geolocation coordinates obtained for the primary mode device are more than a threshold distance (e.g., 100 feet) from the geolocation coordinates obtained for a given secondary mode device, the disconnection processing tool 510 may either transmit data to the software service to cause the software service to disconnect the secondary mode device therefrom or prompt the user at the primary mode device to indicate whether to disconnect the secondary mode device from the software service. For example, a user with a smartphone as a primary mode device and a tablet computer as a secondary mode device may leave his or her office where the tablet computer is located without first disconnecting the tablet computer from a conference. The user may receive a prompt at the smartphone upon the smartphone and tablet computer being determined to be the threshold distance from one another to ask whether to disconnect the tablet computer from the conference. In some such implementations, the threshold distance may be configurable.

Although the tools 502 through 510 are shown as functionality of the device mode designation software 500 as a single piece of software, in some implementations, some or all of the tools 502 through 510 may exist outside of the device mode designation software 500 and/or the software platform may exclude the device mode designation software 500 while still including the some or all of tools 502 through 510 in some form elsewhere. In some implementations, one or more of the tools 502 through 510 may be omitted. For example, the software service interface 502 may be omitted where the software service includes the device mode designation software 500.

Figure 6A:
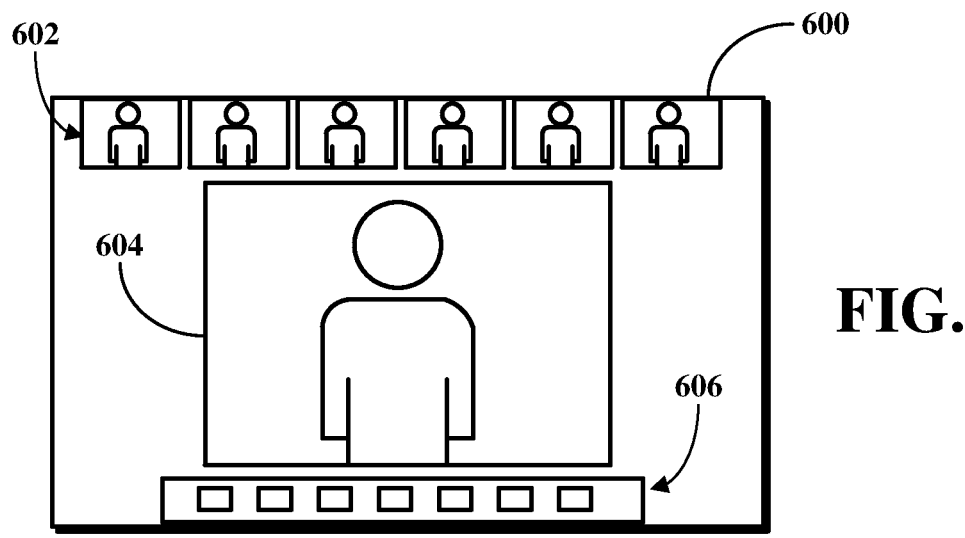
FIGS. 6A-C are illustrations of examples of user interfaces (UIs) output for display at devices in a primary mode or a secondary mode.
Figure 6B:
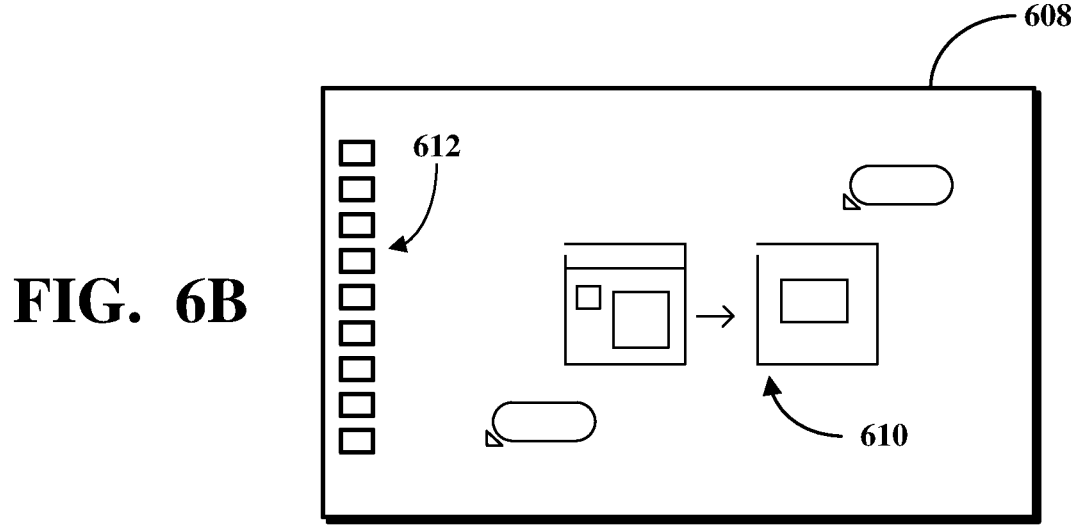
Figure 6C:
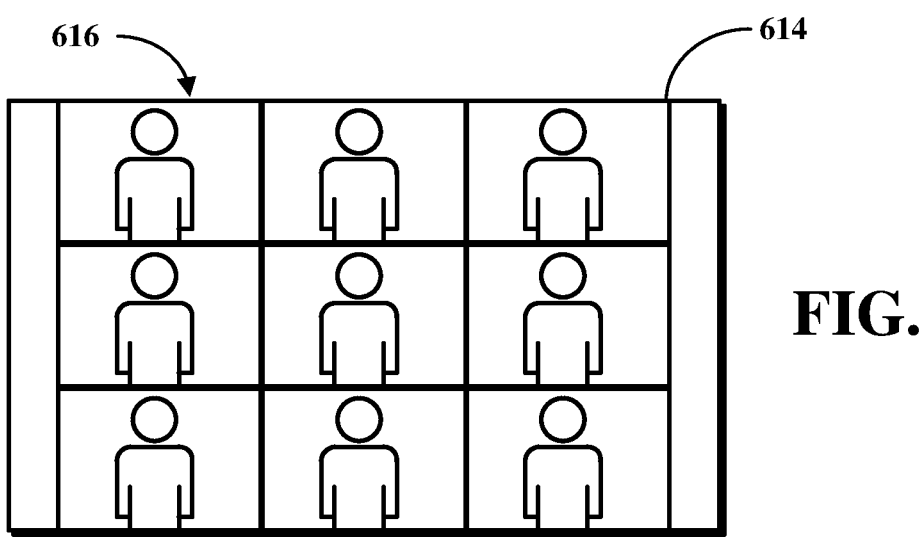

FIGS. 6A-C are illustrations of examples of UIs output for display at devices in a primary mode or a secondary mode. Referring first to FIG. 6A, a primary mode UI 600 for conferencing software is shown. The primary mode UI 600 includes multiple UI tiles 602 for various conference participants, a main speaker UI tile 604 for a conference participant who is actively speaking, and controls 606. One of the UI tiles 602 or 604 is presented for the user, who can navigate the software without limitation as a typical user. Referring next to FIG. 6B, a first secondary mode UI 608 for the conferencing software is shown. The first secondary mode UI 608 presents a digital whiteboard and includes a whiteboarding space 610 and whiteboarding controls 612. The first secondary mode UI 608 is output at a device designated in a secondary mode, in particular, the companion mode. Referring last to FIG. 6C, a second secondary mode UI 614 is shown. The second secondary mode UI 614 includes multiple UI tiles 616 arranged in a gallery format. The UI tiles 616 include at least some of the UI tiles 602 and 604. The second secondary mode UI 614 is output at a device designated in a secondary mode, in particular, the view-only mode.

Figure 7:
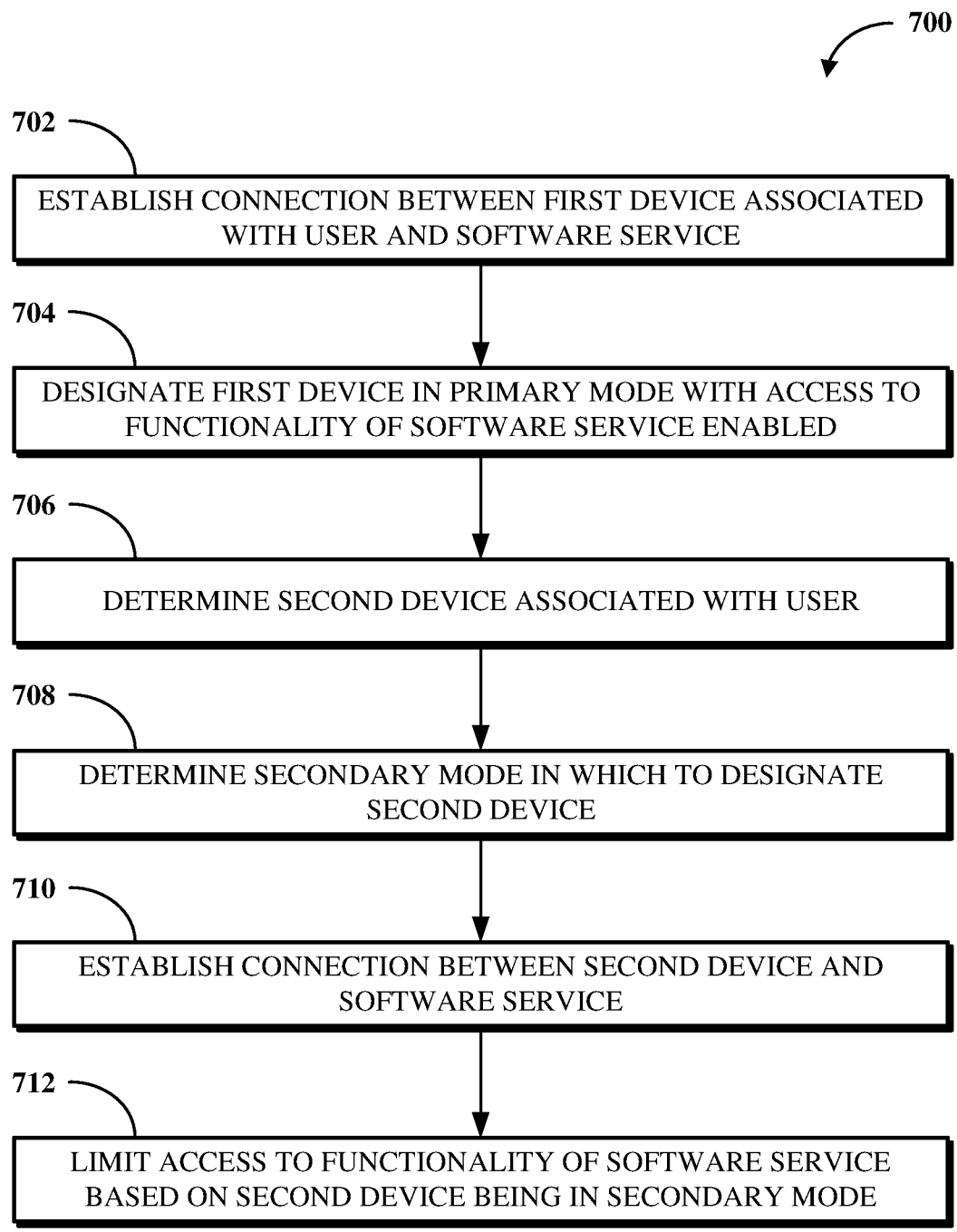
FIG. 7 is a flowchart of an example of a technique for secondary mode device software access for primary mode device users.
Figure 8:
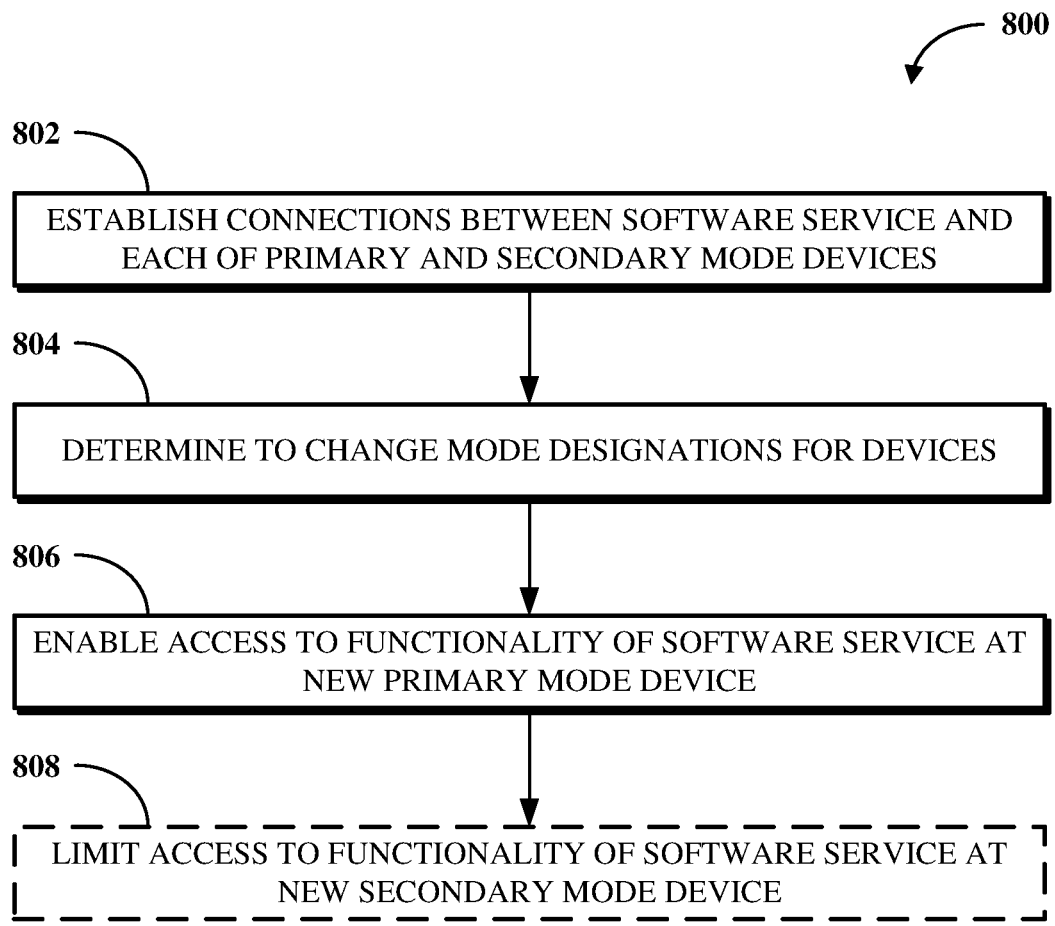
FIG. 8 is a flowchart of an example of a technique for changing device mode designations for devices connected to a software service.

To further describe some implementations in greater detail, reference is next made to examples of techniques which may be performed by or using a system for secondary mode device software access for primary mode device users. FIG. 7 is a flowchart of an example of a technique 700 for secondary mode device software access for primary mode device users. FIG. 8 is a flowchart of an example of a technique 800 for switching device mode designations between devices connected to a software service.

The technique 700 and/or the technique 800 can be executed using computing devices, such as the systems, hardware, and software described with respect to FIGS. 1-6C. The technique 700 and/or the technique 800 can be performed, for example, by executing a machine-readable program or other computer-executable instructions, such as routines, instructions, programs, or other code. The steps, or operations, of the technique 700 and/or the technique 800 or another technique, method, process, or algorithm described in connection with the implementations disclosed herein can be implemented directly in hardware, firmware, software executed by hardware, circuitry, or a combination thereof.

For simplicity of explanation, the technique 700 and the technique 800 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 7, the technique 700 for secondary mode device software access for primary mode device users is shown. At 702, a connection is established between a first device associated with a user and a software service. The connection may be established by the first device accessing the software service, such as through a client application, a web browser, or another software application. In some cases, for example, where the software service includes conferencing software, establishing the connection between the software service and the first device includes opening a channel between the first device and a server device at which the software service is wholly or partially implemented.

At 704, the first device is designated in the primary mode. In particular, the first device is designated in the primary mode based on the first device being the first or only device associated with a user account for the user to be connected to the software service at a given time. Access to functionality of the software service is enabled at the first device based on the first device being in the primary mode. The first device, as the primary mode device, has access to the full range of functionality as is typically available to users of the software service.

At 706, a second device associated with the user is determined. Determining the second device includes identifying one or more other devices associated with the same user account as the first device. In some cases, the second device can be determined based on the user account being actively logged into at a client application running at the second device. In some cases, the second device can be determined based on a prior authentication of the second device in connection with the user account, such as based on data stored in response to the user account previously being logged into at the second device.

At 708, a secondary mode in which to designate the second device is determined. The secondary mode may be one of a plurality of secondary modes which includes a companion mode, a view-only mode, and a listen-only mode. Determining the secondary mode in which to designate the second device includes determining whether to connect the second device to the software service in the companion mode, the view-only mode, or the listen-only mode based on one or more of an input component of the second device, an output component of the second device, or a device type of the second device. For example, the second device may be designated in the companion mode where capabilities thereof are determined to include components for audio and/or video input capture and output presentation. In another example, the second device may be designated in the companion mode where it is determined to include a hardware encoder (e.g., for video encoding). Similarly, the second device may be designated in the view-only mode or the listen-only mode based on the second device being determined to omit audio and/or video input capture components and/or a hardware encoder. Examples of other secondary modes in which a device may be designated include, but are not limited to, an audio capture-only mode, a video capture-only mode, a data entry-only mode, or a combination of two or more of those. For example, devices which may be put in an audio capture-only mode include microphones; devices which may be put in a video capture-only mode include cameras; devices which may be put in a data entry-only mode include keyboards, mice, touch pads, digital whiteboards, gaming controllers, joysticks, and remote controls.

The functionality of the software service accessible at the second device differs based on the particular secondary mode in which the second device is designated. For example, each of a first subset of the functionality of the software service accessible at the second device when the second device is in the companion mode, a second subset of the functionality of the software service accessible at the second device when the second device is in the view-only mode, and a third subset of the functionality of the software service accessible at the second device when the second device is in the listen-only mode may all be different. However, in some cases, certain functionality of the first, second, and third subsets may be the same or otherwise overlap.

Because the functionality of the software service is being limited, the specific functionality being limited depends upon the software service itself. For example, where the software service is conferencing software, the first subset of the functionality of the software service may limit the second device in the companion mode to a limited subset of controls for the conferencing software and to digital whiteboarding functionality of the conferencing software, the second subset of the functionality of the software service may limit the second device in the view-only mode to outputting video streams presented by the conferencing software, and the third subset of the functionality of the software service may limit the second device in the listen-only mode to outputting audio streams presented by the conferencing software.

At 710, a connection is established between the second device and the software service. The connection may be established between the second device and the software service based on pull processing or push processing. For example, where pull processing is used, the user of the second device may be prompted to establish the connection between the software service and the second device responsive to an authentication of the user at the second device, such as based on the earlier determination that the user account for the user is logged in at the second device. In another example, where push processing is used, the connection may be established between the software service and the second device responsive to a request from the user of the second device, such as which may be transmitted from a client application at which the user account is logged in at the second device.

At 712, responsive to the connection established between the software service and the second device, access to the functionality of the software service is limited based on the second device being in the secondary mode. The second device may now be used with the software service in the secondary mode, however the second device, as a secondary mode device, will have access to less functionality of the software service than the first device, as the primary mode device.

Referring next to FIG. 8, the technique 800 for changing device mode designations for devices connected to a software service is shown. At 802, connections are established between a software service and each of a first device, designated as a primary mode device, and a second device, designated as a secondary mode device. For example, the connections may be established according to the operations described with respect to the technique 700 shown in FIG. 7.

At 804, a determination is made to change the mode designation for one or both of the first device or the second device. In some cases, the determination to change the mode designation for one or both of the first device or the second device may be based on input received from a user of the first device and the second device at either of those devices. For example, the user may indicate to change the second device to the primary mode, in which the first device may be changed to a secondary mode and remain connected to the software service or be disconnected from the software service. In some cases, the determination to change the mode designation for one or both of the first device or the second device may be based on a disconnection of the first device from the software service or the addition of a third device as another secondary mode device.

At 806, access to functionality of the software service is enabled at the second device, as the new primary mode device, based on the second device being in the primary mode.

At 808, where the first device remains connected to the software service, access to the functionality of the software service is limited at the first device, as a new secondary device, based on the first device being in a secondary mode.

Thus, as a result of changing the first device to the secondary mode and the second device to the primary mode, access to the functionality of the software service is enabled at the second device and access to the subset of the functionality of the software service is limited at the first device. The technique 800 may omit the operations performed at 808 where the first device does not remain connected to the software service.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   connecting a first device associated with a user to a video conference implemented using conferencing software;
   enabling, based on the first device being in a primary mode, access at the first device to default functionality of the conferencing software during the video conference;
   connecting a second device associated with the user to the video conference; and
   limiting, based on the second device being in a secondary mode, access at the second device to digital whiteboard functionality of the conferencing software during the video conference; and
   displaying, based on the connection and a mode of the first device and the second device to the video conference, a single user interface tile representing the user within a user interface of the conferencing software.

2. The method of claim 1, comprising:
   determining the secondary mode for the second device from amongst a plurality of secondary modes including a companion mode and a view-only mode.

3. The method of claim 1, comprising:
   obtaining, from the second device, input usable to modify a digital whiteboard shared during the video conference.

4. The method of claim 1, comprising:
   outputting, for display at the second device, a digital whiteboard shared during the video conference.

5. The method of claim 1, comprising:
   changing the first device to the secondary mode and the second device to the primary mode to enable access at the second device to the default functionality of the conferencing software and to limit access at the first device to the digital whiteboard functionality of the conferencing software.

6. The method of claim 1, comprising:
   determining to designate the second device within the secondary mode based on the second device including a hardware encoder.

7. The method of claim 1, wherein the default functionality of the conferencing software includes audio and video input capture, audio and video output presentation, and conference control selection.

8. The method of claim 1, wherein the first device is one of a desktop computer or a laptop computer and the second device is one of a tablet computer or a smartphone.

9. A non-transitory computer readable medium storing instructions operable to cause one or more processors to perform operations comprising:
   connecting a first device associated with a user to a video conference implemented using conferencing software;
   enabling, based on the first device being in a primary mode, access at the first device to default functionality of the conferencing software during the video conference;
   connecting a second device associated with the user to the video conference;
   limiting, based on the second device being in a secondary mode, access at the second device to digital whiteboard functionality of the conferencing software during the video conference; and
   displaying, based on the connection and a mode of the first device and the second device to the video conference, a single user interface tile representing the user within a user interface of the conferencing software.

10. The non-transitory computer readable medium of claim 9, wherein the digital whiteboard functionality to which the second device has access differs according to whether the secondary mode is a companion mode or a view-only mode.

11. The non-transitory computer readable medium of claim 9, the operations comprising:
    changing the first device to the secondary mode and the second device to the primary mode during the video conference.

12. The non-transitory computer readable medium of claim 9, the operations comprising:
    determining to designate the second device within the secondary mode based on the second device including a hardware encoder.

13. The non-transitory computer readable medium of claim 9, wherein the second device is connected to the video conference based on an authentication of the user at the second device.

14. An apparatus, comprising:
    a memory; and
    a processor configured to execute instructions stored in the memory to:
    connect a first device associated with a user to a video conference implemented using conferencing software;
    enable, based on the first device being in a primary mode, access at the first device to default functionality of the conferencing software during the video conference;
    connect a second device associated with the user to the video conference; and
    limit, based on the second device being in a secondary mode, access at the second device to digital whiteboard functionality of the conferencing software during the video conference; and
    display, based on the connection and a mode of the first device and the second device to the video conference, a single user interface tile that represents the user within a user interface of the conferencing software.

15. The apparatus of claim 14, wherein the processor is configured to execute the instructions to:
    determine the secondary mode for the second device.

16. The apparatus of claim 14, wherein, where the secondary mode is a companion mode, the digital whiteboard functionality to which the second device has access enables the second device to transmit input for modifying a digital whiteboard shared to the video conference, and, where the secondary mode is a view-only mode, the digital whiteboard functionality to which the second device has access limits the second device to outputting the digital whiteboard for display.

17. The apparatus of claim 14, wherein a user interface of the video conference is output for display at the first device while a user interface of a digital whiteboard shared to the video conference is output for display at the second device.

18. The apparatus of claim 14, wherein the processor is further configured to designate the second device within the secondary mode based on the second device including a hardware encoder.

19. The apparatus of claim 14, wherein the user is prompted to connect the second device to the video conference.

20. The apparatus of claim 14, wherein the conferencing software is implemented by a unified communications as a service platform.

* * * * *